Patented Nov. 6, 1951

2,573,690

UNITED STATES PATENT OFFICE 2,573,690

METHOD OF TREATING EARTH FORMATIONS

Paul H. Cardwell and Parke D. Muir, Tulsa, Okla., assignors to The Dow Chemical Company, Midland, Mich., a corporation of Delaware No Drawing. Application March 25, 1948, Serial No. 17,117

3 Claims. (Cl. 166—22)

1

The invention relates to methods of treating earth formations, especially those penetrated by a bore hole such as a deep well drilled for oil or gas. It more particularly concerns an improved method of bringing about consolidation of loose earth formations but without complete blocking of the interstices to fluid flow.

In the copending application of one of us, viz., Paul H. Cardwell, Serial No. 636,272, filed December 20, 1945, there is disclosed a method of consolidating fluid permeable loose earth formations, such as those penetrated by a well, without complete blocking of the interstices to fluid flow. The method is based upon the injection into the formations penetrated by the well of a liquid mixture of resin-forming ingredients, capable of reacting in situ to form a solid resin, and a liquid diluent soluble in the mixture but not in the solid resin. Upon permeating the interstices of the particles of the earth formation, the resin-forming ingredients in the liquid mixture react in situ to form a solid resin, coating the earth particles and cementing them together. At the same time, the liquid diluent, which is rejected from the mixture as the resin hardens, holds open the fluid passages between the resin coated earth particles so that the treated formation remains fluid permeable although consolidated.

In the practical application of this method difficulties are sometimes encountered as when the formations to be treated are traversed by channels, fissures, or cracks. We have found that the earth consolidation resin-forming liquid mixture enters the fissures, channels, and cracks in preference to the interstices between the particles of the earth formation itself so that the liquid mixture may become lost in the formation without producing the desired consolidation. Heretofore, in the use of resin-forming liquids for producing a sealing and cementing action in earth formations of deep wells, rather than consolidation without sealing, it has been proposed to add fillers of certain fibrous or lamellar materials to the resin-forming liquid mixtures so as to prevent their being uselessly drained away into the earth. Examples of fillers disclosed in U. S. 2,274,297 are shredded or powdered asbestos, hemp, sawdust, and wood. Lamellar fillers, such as fragmented cellophane, are disclosed in U. S. 2,353,372. While the use of these fillers with conventional resin-forming liquids in wells is generally successful when a sealing or cementing operation is performed, as when the mixture of filler and resin-forming liquid is introduced into a well hole to seal off water or cement casing,

2 for example, attempts to use these and like conventional fillers in the aforesaid earth consolidation resin-forming mixture, not intended to produce fluid impervious seals, have not been successful.

The conventional fillers filter out and deposit as a filter cake not only in the channels, fissures and cracks in the formation to be consolidated but also upon the face of the fluid permeable portions of the formation between the openings of the channels, fissures, and cracks. The filter cake thus deposited becomes consolidated and being of conventional fillers is then impervious to fluids, so that fluid flow from the formation into the well is blocked by the cake. The conventional fillers thus cannot be used effectively with the aforementioned earth consolidation type of resin-forming liquids when it is desired to produce consolidation within the formation and therefrom produce fluid such as oil or gas.

It is the principal object of the invention to provide an improved method of producing consolidation within an earth formation using an earth consolidating resin-forming liquid mixture of the type disclosed in the aforesaid copending patent application, which cements together the loose particles of fluid permeable earth without blocking fluid flow through their interstices, whereby excessive drainage of the liquid mixture into channels, fissures, and cracks is prevented. Other objects and advantages will appear as the description of the invention proceeds.

Our invention is predicated upon the use, in conjunction with the earth consolidating resin-forming liquid mixture, as a filler, of a solid substance in granular form in two ranges of particle size, one being coarse and corresponding in size to the channels, fissures, and cracks, the other comparatively fine and corresponding in size to the particles of the formation to be consolidated.

The coarse portion of the filler is so chosen that the particles will be carried into and form a bridge in the channels, fissures, and cracks. As will be understood in the art different formations may be channeled, fissured, or cracked to various extents so that the choice of coarse filler will be made accordingly. As a guide to this choice, we have found that one of the following three general ranges of coarse particle sizes may be used in most instances to achieve the desired channel, fissure, and crack bridging. (1) For large size channels, the coarse particles, for example, may have a size passing a No. 3 standard sieve while being retained upon a No. 10 standard sieve. (2) For medium sized channels, the coarse particles may have a size, for example, passing through a Number 10 standard sieve while being retained on a Number 20 standard sieve. (3) For finely channelled formations, the coarse particles, for example, may be between about 20 and 60 mesh.

The fine portion of the filler comprises particles that are at least as coarse as those of the unconsolidated formation to be consolidated. These particles usually range between a Number 40 and 200 standard sieve, and in some instances as much as 75 percent of the formation may pass a Number 200 and be retained upon a Number 350 standard sieve.

The particles of both the coarse and fine portions of the filler are rounded fragments preferably substantially equiaxed in shape such as those of rounded cubical, near cubical or spherical form, the latter form being preferred, so as to obtain a maximum amount of interstitial space for fluid flow. The usual particle form of sand and fine gravel is generally suitable.

The proportion of coarse particles in the mixture of coarse and fine may vary from about 30 to 60 per cent of the whole filler mixture which should contain at least 15 to 30 per cent of the aforesaid relatively fine particles, that is particles having about the same size as the formation particles. The balance of the filler may consist of particles in either or both ranges of coarse and fine size.

Oil and gas-bearing sands through which oil or gas passes to a well drilled thereinto usually are composed of particles falling within a fairly narrow range of particle sizes and can be consolidated by the method of the aforesaid patent application. Table I sets forth the standard sieve analysis of a few typical unconsolidated oil well sands.

TABLE I

*Sieve analysis of typical unconsolidated oil well sands*

| Sieve Mesh Size | | Percentage of Sample of Sieve Size Given at Left | | | |
|---|---|---|---|---|---|
| Through | Retained on | Miocene Sand from Barbers Hill Field | Oligicine Sand from Manuel Field | Frio Sand from Boling Field | Miocene Sand from Boling Field |
| 20 | 40 | 0.4 | 3.5 | 1.6 | 4.3 |
| 40 | 60 | 3.9 | 20.5 | 4.5 | 17.2 |
| 60 | 80 | 25.0 | 54.1 | 42.4 | 41.7 |
| 80 | 100 | 28.4 | 17.5 | 29.7 | 21.0 |
| 100 | 200 | 36.3 | 4.1 | 20.1 | 12.1 |
| 200 | | 6.0 | 0.3 | 1.7 | 3.7 |

In the foregoing table, the oil-producing sands exemplified are composed of particles more than 90 per cent of which pass through a 40 mesh standard sieve and are retained on a 200 mesh. In general, the sands or formations with which the invention finds its widest use are composed of particles at least 90 per cent of which are retained upon a 200 mesh sieve while at least 90 per cent of those so retained pass through a 10 mesh sieve.

As already indicated, the function of the filler used in accordance with this invention is to prevent wastage of the earth consolidation resin-forming liquid into channels, fissures, and cracks while permitting injections of the liquid into the interstices of the unconsolidated particles of the formation and without producing a fluid impervious cemented filter cake on the formation. To achieve this, we add to the earth consolidating resin-forming liquid mixture a granular filler that is partly composed of the particles having about the same size of that of the unconsolidated sand and partly coarser particles. The coarser particles bridge the openings into the channels, fissures, and cracks while the finer particles, which simulate the formation itself, bridge the interstices of the coarse particles of filler so that the deposit of filler or filter cake obtained is pervious to fluid and possesses about the same size interstices as the formation.

The following examples tabulated in Table II are illustrative of filler mixtures composed of both coarse and fine particles, the former serving for channel bridging and the latter for partly closing the bridged passages and keeping the interstices of the formation open to fluid flow after consolidation as aforesaid. Standard sieve numbers are used.

TABLE II

*Examples of fillers*

| Sieve Numbers | | Percentage of Samples of Sizes Given at Left, Example No. | | |
|---|---|---|---|---|
| Through | Retained on | 1 | 2 | 3 |
| 3 | 10 | 55 | ---- | ---- |
| 10 | 20 | 14.5 | 43.7 | ---- |
| 20 | 40 | 10.5 | 9.5 | 4.1 |
| 40 | 60 | 1.5 | 9.7 | 36.4 |
| 60 | 80 | 2.4 | 8.7 | 33.7 |
| 80 | 100 | 15.6 | 26.3 | 22.8 |
| 100 | 200 | 0.5 | 2.1 | 3.0 |
| Total | | 100 | 100 | 100 |

In the foregoing table Example No. 1, for instance, is typical of a screen or sieve analysis of a filler generally suitable for formations having large channels. In this example 55 per cent of the filler is composed of relatively large particles, i. e. particles having a mesh size between about 0.25 inch and 0.1875 inch. The balance of the filler simulates, in particle size, typical fluid permeable earth formations the sieve analysis of which are given in Table I. The filler of Example 2 is suitable for use with formations having channels of moderate size, while the filler of Example 3 is suitable for use in formations having but small sized channels or fissures.

The filler, comprising the mixture of coarse and fine particles, as above described, may be mixed with a suitable liquid vehicle, e. g. oil, water, brine, and the mixture of vehicle and filler introduced into the well so as to carry the filler particles into the channels, fissures, and cracks before introducing the resin-forming earth consolidating liquid into the well and thence into the formation or the filler may be mixed with the earth consolidation liquid, and, using the latter liquid as the vehicle for the filler, the mixture introduced into the well. We have found that it is advantageous to employ about 0.25 to 1.0 pound of filler mixture for each gallon of liquid vehicle. After or during the introduction of the filler in admixture with the liquid vehicle into the well, pressure may be applied, if necessary, so as to force the filler into the channels, fissures, and cracks and form a cake on the face of the formation. When the liquid vehicle for the filler is the earth consolidating resin-forming liquid, a quantity sufficient to impregnate the formation to the desired extent is used. If the filler is conveyed to the formation by another liquid, it is to be followed by the resin-forming liquid and the amount of the latter liquid which is used is governed by the same considerations as to the depth of impregnating it is desired to produce. For example, we have found that about 5 to 50 gallons of resin-forming liquid may be used per vertical foot of well hole in the formation to be treated.

Various solid substances may be used for the filler that have preferably about the same specific gravity as that of the liquid vehicle used to convey the filler to the earth formation. The specific gravity of the earth consolidation resin-forming liquid mixture aforementioned including the diluent lies between about 0.97 and 1.05. We have found that suitable solids which may be comminuted to the desired sizes and form of filler particles of suitable specific gravity are walnut shells, (sp. gr. 1.3), pecan shells, (sp. gr. 1.17), cocoanut shells, (sp. gr. 1.43), gilsonite, (sp. gr. 104), solidified phenolaldehyde resins, (sp. gr. 1.20–1.30), and polystyrene, (sp. gr. 1.05–1.07). Other granulated solids may be used that have a specific gravity similarly approximating that of the vehicle.

The following example is illustrative of the preparation of an earth consolidation thermosetting resin-forming liquid mixture which cements fluid permeable loose earth particles together at the temperatures encountered in deep well formations without blocking the interstices to fluid flow.

EXAMPLE A 390 pounds of phenol are mixed with 506 pounds of 37 per cent (by weight) aqueous formaldehyde solution and 50 pounds of a 50 per cent (by weight) aqueous solution of caustic soda as a catalyst and the mixture cooked at 175° F. until it attains a viscosity of about 8 centipoises. This cooking requires about 2.5 hours. The cooked mixture is treated with hydrochloric acid solution in amount sufficient to reduce the pH of the mixture to about 4. This requires about 62.3 pounds of 32 per cent hydrochloric acid. The addition of the acid results in the formation of a two layer system, the water layer being rejected, leaving 64 gallons of resin-forming liquid having a viscosity of about 300 centipoises. The resin-forming liquid is diluted with a liquid diluent that is soluble in the resin-forming liquid but not in the resin into which the resin-forming ingredients in the liquid solidify when suitably catalyzed. Examples of suitable diluents are: methyl alcohol and ethyl alcohol. As much as 1.5 volumes of the alcohol may be used for each volume of the resin-forming liquid. When diluted with 1.5 volumes of methyl alcohol the specific gravity of the mixture is 0.99.

In using the mixture of resin-forming liquid and diluent therefor, to convey the filler to the formation as well as consolidate it, about 0.25 to 1 pound of filler above described are added per pound of liquid vehicle, and, just before the mixture is to be injected into the formation to be consolidated a catalyst is added, such as an aqueous solution of an alkali metal hydroxide or carbonate, which promotes the condensation of the resin-forming ingredients in the resin-forming liquid into a solid resin. The amount of catalyst used determines, at a given temperature, the rate at which the resin-forming constituents in the mixture condense into a solid resin. By using as a catalyst, a predetermined amount of the aqueous alkaline solution, known setting times may be had. As an example, a suitable catalyst is obtained by dissolving 275 pounds of potassium carbonate and 41 pounds of potassium hydroxide in 36 gallons of water. This solution added to the resin-forming liquid, prepared as above described, in the amount of 12.5 gallons of the alkali solution per 100 gallons of the resin-forming liquid diluted with 150 gallons of methyl alcohol causes the resin-forming ingredients in the mixture to set into a solid resin in 4 hours at 175° F. At 190° F., 5 gallons of the alkaline solution similarly used produces setting in 4 hours, and 1.5 gallons produces setting in 4 hours at 210° F.

Other resin-forming liquid mixtures of the phenol-aldehyde type may be used which, upon dilution with a liquid diluent that is soluble in the liquid mixture but not in the resin formed therefrom, set to a solid resin cementing fluid permeable loose earth particles together without blocking the interstices to fluid flow.

EXAMPLE B

The following is another example of a suitable diluted thermosetting resin-forming liquid which is composed of two diluted partially condensed phenol-aldehyde type resin-forming liquids. When suitably catalyzed, the mixture sets to a solid resin cementing fluid permeable loose earth particles but without blocking the interstices to fluid flow. It is especially useful in formations having a temperature below about 175° F. One of the two partially condensed resin-forming liquids is prepared as follows: To 64 gallons of the resin-forming liquid of Example A (before the addition of catalyst and diluent) add 410 pounds of resorcinol and stir the mixture until the resorcinol is dissolved. There is thereby obtained 107 gallons of the resin-forming liquid which is then diluted with 160.5 gallons of methyl alcohol to make about 267.5 gallons of a diluted resin-forming liquid mixture having a specific gravity of 1.02. It is designated L1. The other partially condensed resin-forming liquid is prepared as follows: Mix together 600 pounds of cresylic acid (commercial), 500 pounds of paraformaldehyde and 25 pounds of 50 per cent aqueous caustic soda solution and maintain the mixture at about 130° F. until the paraformaldehyde dissolves. This paraformaldehyde usually dissolves in about 30 minutes. The dissolving reaction is exothermic and is conducted preferably in a conventional reaction vessel provided with cooling means so that the temperature of the reaction is prevented from exceeding the aforesaid temperature. After the paraformaldehyde is dissolved, the reaction mass is acidified to a pH of about 4 with hydrochloric acid. This may be accomplished by using 31.15 pounds of 32 per cent (by weight) aqueous hydrochloric acid. After neutralization, there is obtained about 105 gallons of resin-forming liquid having a viscosity of about 100 centipoises. This resin-forming liquid is diluted with 157.5 gallons of methyl alcohol thereby producing about 262.5 gallons of a diluted resin-forming liquid mixture having a specific gravity of 0.98. It is designated L2.

The two diluted resin-forming liquid mixtures (L1 and L2) are mixed in equal volumes as aforesaid before use, the mixing being delayed until just before the earth formation is to be consolidated and then the requisite amounts of filler and catalyst are also added. The amount of catalyst used determines the setting time at a given earth temperature. As the catalyst there is used a 25 per cent by weight aqueous solution of caustic soda. For example, to obtain setting of caustic soda. For example, to obtain setting and consolidation in about 4 hours at 90° F. there is used 3 gallons of the aqueous caustic soda solution per 100 gallons of the equal volume mixture of L1 and L2. At 150° F., 0.5 gallon suffices to produce hardening in 4 hours.

The amount of catalyst solution to employ to obtain setting at other times and temperatures may be estimated by extrapolation and interpolation from the foregoing data of setting temperatures and catalyst proportions.

The following data in Table III illustrate the effect on the fluid permeability of consolidating the unconsolidated oil well sands of Table I using a resin-forming liquid mixture of Example B. In these data, the fluid permeability of the sand before and after consolidation was measured using as the earth consolidation resin-forming liquid mixture equal volumes of L1 and L2 catalyzed with 3 gallons of 25 per cent aqueous caustic soda solution per 100 gallons of the resin-forming mixture. The temperature of the consolidation was about 90° F. and about 0.25 of a pound of ground walnut shells having the sieve analysis of Example 1 was added to the earth consolidation resin-forming liquid mixture per 100 gallons thereof.

TABLE III

Permeability of oil well sands before and after consolidation

| Oil Well Sand | Permeability in Millidarcys | |
|---|---|---|
| | Unconsolidated | Consolidated |
| Miocene: Barbers Hill Field | 9,010 | 2,760 |
| Oligicine: Manuel Field | 24,920 | 4,960 |
| Frio: Boling Field | 11,270 | 3,960 |
| Miocene: Boling Field | 22,640 | 3,800 |

Similar results to those in Table III are obtained upon using other similar diluted resin-forming earth consolidating liquid mixtures containing granulated filler having a proportion of about 30 to 60 per cent of particles the same size as those of the formation to be consolidated in admixture with a proportion of 15 to 30 per cent of coarse particles larger than those of the formation but small enough to pass into and bridge therein the channels, fissures, and cracks.

Although the practice of the method has been exemplified more particularly in connection with producing sands having unconsolidated particles of a sieve size between a number 40 and 200, it is to be understood that the method may be practiced similarly on unconsolidated formations of which up to 75 per cent of the particles pass a number 200 sieve while being retained upon a number 350 sieve.

We claim:

1. The method of consolidating a channeled, fissured, or cracked fluid permeable earth formation consisting of earth particles at least 90 per cent of which pass through a number 20 and are retained on a number 200 standard sieve, said formation being penetrated by a well bore, which comprises introducing into the well bore and thence into the formation a resin-forming liquid capable of forming a hard resin in situ, said resin-forming liquid comprising a mixture of a phenol and an aldehyde together with a catalyst promoting their condensation to a hard resin, said mixture being diluted with a liquid soluble therein but not in the resin and carrying in suspension a filler consisting of rounded granules of which by weight 30 to 60 per cent exceed the sieve size of the earth formation and pass a number 3 standard sieve, 15 to 30 per cent have substantially the same sieve size as those of the earth formation, the balance of the filler particles having a sieve size between a number 3 and 200, the amount of said filler being from 0.25 to 1.0 pound per pound of diluted resin-forming liquid mixture.

2. The method according to claim 1 in which the diluent is methyl alcohol.

3. The method according to claim 1 in which the diluent is ethyl alcohol.

PAUL H. CARDWELL.
PARKE D. MUIR.

REFERENCES CITED

The following references are of record in the file of this patent:

UNITED STATES PATENTS

| Number | Name | Date |
|---|---|---|
| 2,146,480 | Kennedy | Feb. 7, 1939 |
| 2,206,677 | Shepler | July 2, 1940 |
| 2,221,261 | Lehnhard, Jr. | Nov. 12, 1940 |
| 2,337,295 | Kennedy | Dec. 21, 1943 |
| 2,345,611 | Lerch et al. | Apr. 4, 1944 |
| 2,348,484 | Lawton | May 9, 1944 |